B. LJUNGSTRÖM.
SHAFT PACKING.
APPLICATION FILED MAR. 27, 1908.
913,407.
Patented Feb. 23, 1909.
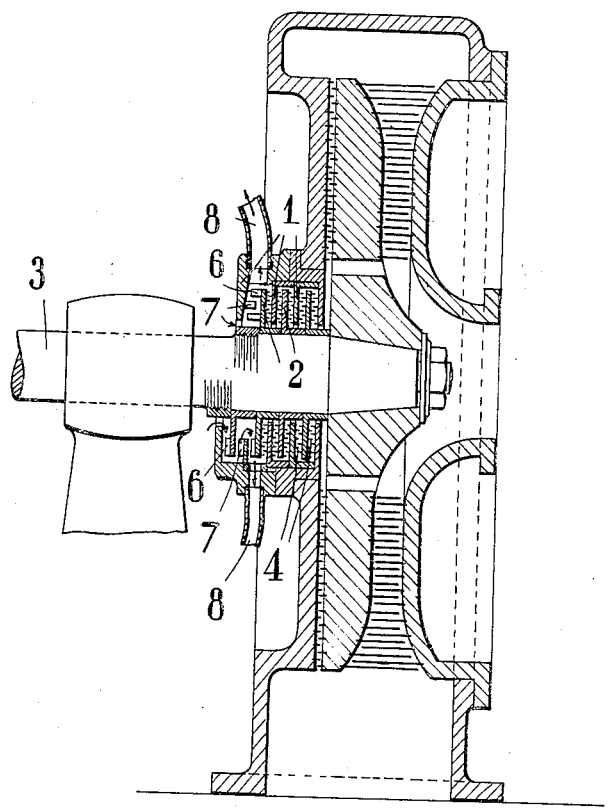
Witnesses.
Jesse N. Lutton.
B. N. Sommers
Inventor.
Birger Ljungström
by Henry Orth
Atty.

UNITED STATES PATENT OFFICE.

BIRGER LJUNGSTRÖM, OF STOCKHOLM, SWEDEN.

SHAFT-PACKING.

No. 913,407.　　　Specification of Letters Patent.　　Patented Feb. 23, 1909.

Application filed March 27, 1908. Serial No. 423,683.

*To all whom it may concern:*

Be it known that I, BIRGER LJUNGSTRÖM, of 18 Grefmagnigatan, Stockholm, Sweden, have invented certain new and useful Improvements in Shaft-Packing; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention relates to improvements in shaft packing particularly adapted to elastic fluid turbines in which the shaft projects through the turbine casing.

Heretofore so called water-locks or special packing rings around the shaft have been used. The water-locks usually consist of a concentric enlarged chamber arranged around the shaft with or without rotating vane disks placed within the chamber. If the water-lock has no such disk, packing rings are usually arranged around the shaft both on the inside and the outside of the water-lock. If a disk be used the outer packing devices may be omitted. On account of the packing rings which drag against the shaft or the surrounding casing, such packing devices must, in order to work with high steam pressures, be oiled and especially cooled with water. Besides the consumption of oil, the heat lost through the cooling by water has much significance as the loss is greater the nearer the packing devices are placed to the warmest parts of the turbine. This loss of heat may therefore be considerable in radial turbines having one sided bearings where, as is evident from the annexed drawing the shaft packing must be placed close to the hot vane-disk in order that the momentum of said disk in regard to the bearing may not become too large.

The object of the present invention is to evade the water-lock as well as to avoid the use of both water-cooling and oiling of the shaft-packing.

For this purpose the shaft packing consists exclusively of a number of concentric baffling devices arranged around the shaft, so that the stationary and the rotary parts do not come into contact with each other and therefore require neither oiling nor cooling.

The accompanying drawing is a vertical section of a turbine embodying my invention in which—

—1— designates stationary annular disks connected to the turbine casing, and —2— like disks alternating with the former disks and connected to and rotating with the turbine-shaft —3—. Disks —1— and —2— are provided with threaded annular side projections forming spaces —4— between the disks for the driving medium which leaks into the casing.

In most devices, the outer interspace between the stationary or the rotating parts of the packing which communicate with the engine room cannot be made sufficiently tight to prevent a part of the driving medium from leaking through into the engine room. By means of my invention I overcome this difficulty by placing between said outer parts vanes —6— which act as a fan. These vanes are arranged in widened annular parts of the baffling device and may, as shown below the shaft, be of a radial type, or as shown above the shaft, of an axial type, and one or more pressure zones may be arranged by means of stationary vane rings —7—. The principal feature of this fan device in its different modifications consists in that the stationary and rotating vane rings are so proportioned and arranged that they generate a superpressure in the direction from the interspace between the outer stationary and rotating parts to the outlet for that driving medium leaking through the inner baffling devices, in consequence of which air is sucked in through said outer interspaces in the baffling device and passes off by way of outlet —8— together with the driving medium that leaks through the tightening device, the driving medium being in this way prevented from penetrating into the engine room. Said tightening device may also be used for compressors or the like.

What I claim is:

1. In a turbine, in combination, a shaft, a casing through which the shaft projects, packing members interposed between the shaft and casing, a chamber beyond the casing communicating therewith and provided with an air inlet, and fans in the chamber.

2. In a turbine, in combination, a shaft, a turbine casing, a casing outside the latter through which the shaft projects, packing members in the outer casing interposed between the latter and shaft, a chamber beyond the outer casing communicating therewith and fans in the chamber.

3. In a turbine, in combination, a shaft, a turbine casing, a casing outside the latter through which the shaft projects, packing members in the outer casing interposed between the latter and shaft, a chamber beyond the outer casing communicating therewith, and provided with an air inlet and an air outlet, and fans in said chamber.

4. In a turbine, in combination, a shaft, a turbine casing, a casing outside the latter through which the shaft projects, packing members in the outer casing interposed between the latter and shaft, a chamber beyond the outer casing communicating therewith and provided with oppositely positioned inlet and outlet ports, and fans in said chamber.

In testimony that I claim the foregoing as my invention, I have signed my name in presence of two subscribing witnesses.

BIRGER LJUNGSTRÖM.

Witnesses:
HJALMAR ZETTERSTRÖM,
K. E. UNBERG.